United States Patent [19]

Yazaki et al.

[11] Patent Number: 4,659,618
[45] Date of Patent: Apr. 21, 1987

[54] COMPOSITE MOLDED PRODUCT

[75] Inventors: Takao Yazaki; Satoru Hattori; Kazuhide Hattori; Takumi Matsuno; Nobuhiro Shibuya; Kazuhide Hayama; Isao Itoh, all of Mie, Japan

[73] Assignee: Mitsubishi Petrochemical Co., Ltd., Tokyo, Japan

[21] Appl. No.: 888,372

[22] Filed: Jul. 23, 1986

[30] Foreign Application Priority Data

Jul. 30, 1985 [JP] Japan .................. 60-168167

[51] Int. Cl.4 .................. B32B 3/26; B32B 7/12
[52] U.S. Cl. .................. 428/317.7; 428/319.7; 428/319.9; 428/424.4; 428/424.8
[58] Field of Search .............. 428/317.1, 317.7, 319.7, 428/319.9, 424.4, 424.8

[56] References Cited

U.S. PATENT DOCUMENTS

| 3,533,901 | 10/1970 | Sutker | 428/317.1 |
| 3,607,602 | 9/1971 | Greskiewicz | 428/317.1 |
| 3,647,609 | 3/1972 | Cyba | 428/317.7 |
| 3,862,880 | 1/1975 | Feldman | 428/319.9 |
| 4,358,489 | 11/1982 | Green | 428/317.7 |
| 4,416,937 | 11/1983 | Metzger | 428/317.7 |
| 4,500,597 | 2/1985 | Yazaki et al. | 428/317.7 |
| 4,567,097 | 1/1986 | Yazaki et al. | 428/317.7 |

Primary Examiner—William J. Van Balen
Attorney, Agent, or Firm—Oblon, Fisher, Spivak, McClelland & Maier

[57] ABSTRACT

A composite molded product according to the present invention has the structure that an olefin-based resin molded product and a urethane foam are integrally laminated with an adhesive resin layer of the invention.

8 Claims, 2 Drawing Figures

COMPOSITE MOLDED PRODUCT

FIELD OF THE INVENTION

The present invention relates to a composite molded product which is useful for use in, for example, a lining heat-insulating material of a main body or door of a refrigerator, a door material of a show window case or unit bath which requires heat-insulating properties, a bumper of an automotive vehicle and an interior material for an automotive vehicle such as a door trimming, which require buffering properties, and a surfboard.

The main body or door of a refrigerator is provided with a lining material produced from a sheet of a styrene-based resin such as an acrylonitrile/butadiene/styrene copolymer (ABS) by vacuum forming or pressure forming or a combination thereof (those forming methods are hereinafter referred to as "differential pressure forming"). This lining material serves to prevent corrosion of a frame of stainless steel or steel which is coated with a paint followed by baking, and also provides projections necessary for holding shelves. An attempt has been made to use a lining material made of a polypropylene having an excellent surface luster and a low degree of water absorption in place of the lining material made of ABS.

Japanese Patent Application (OPI) No. 97841/85 discloses a lining material having the structure that a foamed polyurethane is interposed between a structure substrate and a lining material in order to improve the heat-insulating properties. (The term "OPI" used herein refers to an "unexamined published application.")

The door material of unit bath is recently made of a polyvinyl chloride sheet. However, in the case of using at high temperature, the polyvinyl chloride sheet decomposes and generates chlorine gas, and an aluminum sash is corroded by the chlorine gas. In order to improve this problem, an investigation is made to arrange two polypropylene sheets on the aluminum sash and filling a space surrounded by the aluminum sash and sheet, thereby providing a rigidity as the door.

With respect to the interior material for automotive vehicle such as the door trimming, filling of a foamed polyurethane by injection method is proposed from the standpoints of buffering properties and heat-insulating properties due to the replacement of a metal with a resin.

Thus, a composite of the resin material and foamed polyurethane is demanded in resin products having various complicated shapes.

However, the resin material is generally a sheet or a molded product obtained by heat molding or injection molding the sheet, and when a polyolefin resin having such shape is used, a space is formed due to insufficient adhesive strength between the polyolefin resin and the foamed polyurethane, and the rigidity and the heat-insulating properties cannot be sufficiently achieved.

In order to improve the adhesive strength between the resin material and the foamed polyurethane, Japanese Patent Application (OPI) No. 97841/85, U.S. Pat. Nos. 4,500,597 and 4,567,097 propose coating of a liquid adhesive or a liquid having adhesive properties, and surface treatment with chemicals. However, addition of complicated steps due to increase of the coating step or surface treatment step is not preferred.

SUMMARY OF THE INVENTION

As a result of investigations to eliminate such treatment steps, it has been found that the adhesive strength between the urethane foam and the olefin resin can be improved by adding, for example, ABS to the olefin resin.

Accordingly, an object of the present invention is to provide a composite molded product which overcomes the problems in the prior arts.

The composite molded product according to the present invention has the structure that an olefin-based resin molded product and a urethane foam are integrally laminated with an adhesive resin layer, the adhesive resin having a composition comprising (A) 55 to 90% by weight of an olefin-based resin;
(B) 1 to 30% by weight of an ethylene/acrylic acid copolymer; and
(C) 10 to 30% by weight of a styrene-based resin.

Figure 1:
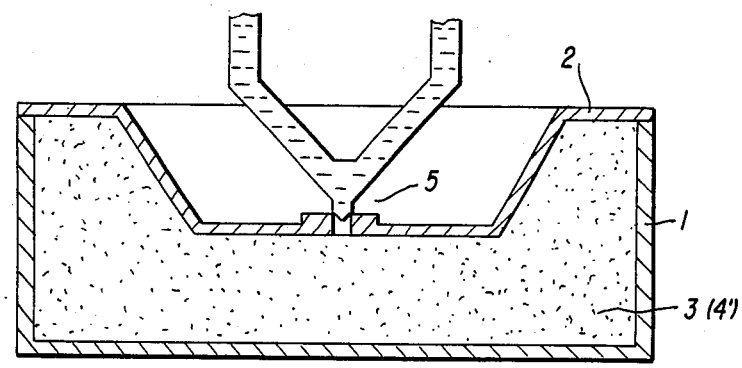
FIG. 1 is a cross-sectional view illustrating one embodiment of the present invention.

In the drawings, 1 is a stainless steel frame, 2 is a laminate sheet for differential pressure forming (lining material), 2a is a surface luster layer, 2b is a deep drawing layer, 2c is an adhesive layer, 3 is a cavity, 4' is a urethane foam, and 5 is an injection inlet.

DETAILED DESCRIPTION OF THE INVENTION

Examples of the olefin-based resin for forming the olefin-based resin molded product include a nonpolar olefin-based resin such as a polyethylene, a polypropylene, an ethylene/propylene copolymer, an ethylene/propylene/butene copolymer, a polystyrene, or a styrene/butadiene/styrene block copolymer, and a carboxyl group-containing olefin-based resin such as an ethylene/acrylic acid random copolymer, an ethylene/methacrylic acid random copolymer, an acrylic acid-grafted polyethylene, a methacrylic acid-grafted polyethylene, a maleic anhydride-grafted polyethylene, a maleic anhydride-grafted polypropylene, a maleic anhydride-grafted polypropylene, a maleic anhydride-grafted ethylene/vinyl acetate copolymer, or an itaconic acid-grafted polyethylene. Those resins can be used alone or as mixtures thereof.

The olefin-based resin can contain a resin such as a polyamide, ABS or an ethylene/vinyl acetate copolymer, a stabilizer, a rubber, a pigment or an inorganic filler.

Further, the olefin-based resin can have a laminate structure, and a specific function can be imparted to the respective layer. For example, in the case where the olefin molded product constitutes a surface material of a show window case or an interior material of a refrigerator, a film made of a propylene homopolymer having a good luster is used as a surface layer, and a sheet made of the following composition having good vacuum forming properties is used as a substrate layer, the composition comprising (a) 20 to 80% by weight, preferably 40 to 70% by weight, of a polypropylene;

(b) 10 to 80% by weight, preferably 10 to 55% by weight, of a polyethylene;

(c) 0 to 35% by weight, preferably 5 to 25% by weight, of a styrene-based resin, and (d) 0 to 65% by weight, preferably 5 to 55% by weight, of an inorganic fine powder.

The polypropylene as Component (a) contributes to the adhesiveness to the propylene homopolymer of the surface luster layer. The polyethylene as Component (b) improves the deep drawing properties of a laminate sheet in vacuum forming. The styrene-based resin as Component (c) contributes to reduce sagging of a laminate sheet which is soften or molten by heating due to its own weight. The inorganic fine powder as Component (d) contributes to not only increase the rigidity of the olefin-based resin molded product but also improve the cooling cycle during vacuum forming the laminate sheet.

Examples of the polypropylene as Component (a) include a propylene homopolymer, a random or black copolymer of propylene with an olefin such as ethylene, butene-1 or hexene, 4-methylpentene-1, and a maleic anhydride-grafted polypropylene.

Examples of the polyethylene as Component (b) include a high density polyethylene, a low density polyethylene, an ethylene/vinyl acetate copolymer, a linear polyethylene, an ethylene/vinyl acetate copolymer, an ethylene/acrylic acid copolymer, an ethylene/methacrylic acid copolymer and SARLINE (a registered trademark, a product of du Pont).

Examples of the styrene-based resin include a polystyrene, a styrene/butadiene/styrene block copolymer (SBS), a styrene/acrylonitrile copolymer (SA), ABS and a high impact polystyrene (HIPS).

Examples of the inorganic fine powder as Component (d) include talc, calcium carbonate, diatomaceous earth, calcined clay and titanium oxide.

The adhesive resin composition which bonds the urethane foam and the olefin-based resin molded product is a mixture comprising (A) 55 to 90% by weight of the olefin-based resin, (B) 1 to 30% by weight of the ethylene/acrylic acid copolymer and (C) 10 to 30% by weight of the styrene-based resin. The mixture can additionally contain an ethylene/propylene copolymer rubber, a styrene/butadiene rubber or the like.

The same olefin-based resins as used in the substrate layer as described above, such as polypropylene or polyethylene, can be used as the olefin-based resin of Component (A). It is preferred to use the same type of the olefin-based resin as in the substrate layer. For instance, when the olefin-based resin of the substrate layer is a mixture of the propylene homopolymer and high density polyethylene, a propylene/ethylene random or block copolymer alone or a mixture of the propylene homopolymer and high density polyethylene is used as the olefin-based resin of the adhesive layer. The propylene/ethylene block copolymer is preferably used. Use of this copolymer provides the advantage that the surface of the adhesive layer extruded from an extruder into a film-like state is coarser than the surface of the film-like adhesive layer obtained from the propylene homopolymer or the propylene/ethylene random copolymer, and so that the adhesiveness between the urethane foam and the substrate layer is improved.

The ethylene/acrylic acid copolymer of Component (B) is a resin having a melt flow rate (MFR) of 1 to 400 g/10 min measured at 190° C. according to JIS K-6758. The resin is obtained by random copolymerization of 70 to 99% by weight of ethylene and 30 to 1% by weight of acrylic acid. The resin is commercially available as YUKALON EAA A500W, YUKALON EAA A221M and YUKALON EAA A200K, products of Mitsubishi Petrochemical Co., Ltd.

If the content of the ethylene/acrylic acid copolymer as Component (B) in the adhesive resin composition is less than 1% by weight, the adhesive strength between the urethane foam and the adhesive layer is poor. On the other hand, if the content thereof is larger than 30% by weight, the mold release property of sheet product when vacuum forming, press forming, pressure forming or injection molding the laminate sheet is poor. However, in the case of hollow molding, the face of the adhesive layer is inside the molded hollow product, and the problem on the mold release property can be disregarded.

In order to improve the mold release property, the styrene-based resin as Component (C) is added, and the amount of the ethylene/acrylic acid copolymer added is decreased. Examples of the styrene-based resin as Component (C) include a polystyrene, ABS, SBS, SA and HIPS. Those styrene-based resins can provide a high adhesiveness between the urethane foam and the adhesive layer.

The olefin-based resin alone as Component (C) in the adhesive does not have adhesive properties to the urethane foam.

The adhesive layer can be molded together with the olefin-based resin molded product. For example, each of resin compositions which form the luster layer, the substrate layer and the adhesive layer is melt kneaded using the individual extruder, the resulting three compositions are fed into one co-extrusion die, each layer is laminated in the die, and the resulting product is subjected to vacuum molding, compression molding or blow molding to prepare a laminate for use as a lining material for a refrigerator, a surfboard or the like.

In the case of a molded product such as a bumper, the adhesive resin composition is injection molded into a metallic mold, the injection molded product is transferred into other metallic mold, and the polypropylene for a surface material is injection molded to obtain a laminate.

The thickness of the laminate is such that the thickness of the olefin-based resin molded product is 0.5 to 15 mm, preferably 2 to 5 mm, and the thickness of the adhesive layer is 5 to 100 μm (an extrusion molded product) or 0.5 to 2 mm (an injection molded product).

If necessary and desired, the surface of the laminate is subjected to a corona discharge treatment or a plasma treatment.

Figure 2:
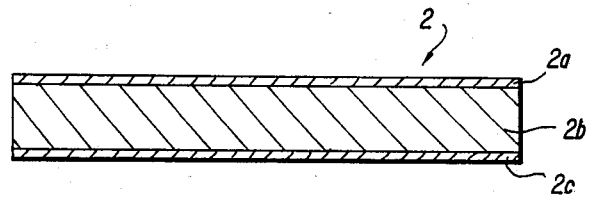
FIG. 2 is a cross-sectional view of a sheet.

FIG. 2 is a cross-sectional view of the laminate 2, wherein 2a is a surface luster layer, 2b is a substrate layer and 2c is an adhesive layer.

The composite molded product is prepared by integrally bonding the olefin-based resin molded product and the urethane foam using the adhesive layer interposed therebetween.

The surfboard is prepared by pouring a foamable urethane solution into the hollow portion of the laminate prepared by blow molding, and foaming the urethane solution therein.

In the case of the interior material of a refrigerator, as shown in FIG. 1, a foamable urethane solution 4 is poured into a cavity 3 formed by a mold frame 1 made of a decorative steel plate and a laminate 1 prepared by vacuum molding, and the solution is foamed and cured to prepare a multi-layer structure wherein the mold frame 1, the urethane foam 4' and the lining material 2 are integrally bonded.

The present invention is described in greater detail with reference to the following examples. All parts and percents (%) are by weight.

Production of Sheet

SHEET PRODUCTION EXAMPLE 1

(i) Resin for Luster Layer (Surface Layer)

A crystalline propylene homopolymer (MFR: 2.0 g/10 min; boiling heptane extraction residue: 99% by weight) was used.

(ii) Resin for Deep Drawing Layer

A mixture of 30% by weight of a crystalline propylene/ethylene block copolymer (ethylene content: 5% by weight; MFR: 0.5 g/10 min; boiling heptane extraction residue: 98% by weight), 45% by weight of polyethylene (density: 0.950 g/cm$^3$; MFR: 0.6 g/10 min) and 20% by weight of talc having a particle diameter of 1.5 μm was kneaded in an extruder and extruded in the form of strand. The strand was cut to form pellets.

(iii) Adhesive Resin on Urethane Foam Side.

A mixture of 85% by weight of a crystalline propylene/ethylene block copolymer having an ethylene content of 5% by weight, MFR of 0.5 g/10 min and a boiling heptane extraction residue of 98% by weight, 5% by weight of an ethylene/acrylic acid random copolymer having an acrylic acid content of 20% by weight and MFR of 300 g/10 min ("EAA 500W", a product of Mitsubishi Petrochemical Co., Ltd.), and 10% by weight of a polystyrene ("DIALEX HT516", a product of Mitsubishi Monsanto Chemical Co., Ltd.) was kneaded in an extruder and extruded in the form of a strand. The strand was cut to form pellets.

The above pellets of the resin (ii) were fed to a three-layer multimanifold die (width: 700 mm) at 230° C. by means of an extruder (diameter of a screw: 90 mm), and the resin (i) and the adhesive resin composition (iii) were fed each other to the same die as above at 220° C. by means of other two extruders (diameter of a screw: 40 mm). The temperature of the die was set at 220° C. A molten three-layer sheet extruded from the die was cooled and solidified successively on three rolls having a width of 700 mm and then subjected to a corona discharge treatment to produce a laminate sheet for vacuum molding. The temperatures of the three rolls were as follows: 40° C. for the nearest roll relative to the die; 95° C. for the intermediate roll; and 40° C. for the farthest roll. The rotation speed of the rolls was 1.5 m/min. The total thickness of the sheet was 1.6 mm; the thickness of the luster layer was 0.15 mm; the thickness of the deep drawing layer (intermediate layer) was 1.35 mm; and the thickness of the adhesive resin layer was 0.1 mm.

SHEET PRODUCTION EXAMPLES 2 TO 10

Laminate sheets were prepared in the same manner as in Sheet Production Example 1 above except for changing the composition of the adhesive resin layer as shown in the Table below.

The abbreviations in the Table are as follows.
PP: A propylene/ethylene block copolymer
E.AA: An ethylene/acrylic acid copolymer
500W: An ethylene/acrylic acid copolymer having an acrylic acid content of 20% by weight and MFR of 300 g/10 min., a product of Mitsubishi Petrochemical Co.
A221M: An ethylene/acrylic acid copolymer having an acrylic acid content of 8.5% by weight and MFR of 7 g/10 min., a product of Mitsubishi Petrochemical Co.
PS: A polystyrene ("DIALEX HT516", a product of Mitsubishi Monsanto Chemical Co.)
SBS: A styrene/butadiene/styrene block copolymer ("TUFFPRENE A", a product of Asahi Kasei Kogyo Co.)

EXAMPLE 1

The sheet was obtained in Production Example 1 introduced in an oven maintained at about 230° C. and was subjected to plug assist vacuum molding (drawing ration H/D=1/1) using an air-pressure of 5.0 kg/cm$^2$ and a vacuum of −600 mm Hg by means of a vacuum/pressure molding machine. The mold release property of the sheet was good, and the plug was easily separated from the sheet.

An injection inlet was bored in the above-molded sheet which was then placed in a stainless steel frame as the main body of a refrigerator. Into a cavity formed between the frame and the sheet was injected through the injection inlet a two pack type expandable urethane solution, HM-1510, produced by Polyurethane Kagaku Kasei Co., Ltd. In 10 seconds after the injection of the urethane solution, it started to expand and in 1 minute the cavity was completely filled with a urethane foam. The density of the urethane foam was 0.05 g/cm$^3$. This procedure was repeated 20 times to obtain 20 samples of the composite molded product.

After 24 hours, a test piece was cut out of the sheet with the urethane foam bonded thereto and was measured for the adhesion between the sheet and the urethane foam in the following method. Adhesion:

After the urethane foam is peeled off from the test piece by hand, a cross cut test is conducted in the manner that eleven longitudinal and horizontal cutting traces are provided by knife on the surface of the sheet having residual urethane to form 100 squares, and an adhesive tape is adhered thereto and rapidly peeled from the sheet to observe the percentage of the urethane unpeeled.

The results obtained are shown in the Table below.

The adhesion is evaluated in the following criteria.

O: Cohesive failure of urethane foam
  Bonded portions of squares: 81/100–100/100
Δ: Cohesive failure of urethane foam and interfacial separation between adhesive and urethane simultaneously occur.
  Bonded portions of squares: 50/100–80/100
X: Adhesion between urethane foam and adhesive layer is poor, and the sheet is easily peeled off at the interface of urethane foam.
  Bonded portions of squares: 0/100–49/100

EXAMPLES 2 TO 5 AND COMPARATIVE EXAMPLES 1 TO 5

Composite molded products were obtained in the same manner as in Example 1 except that laminate sheets obtained in Sheet Production Examples 2 to 9 were used in place of the sheet obtained in Sheet Production Example 1.

The adhesive between the urethane foam and the sheet in those composite molded products are shown in the Table below.

EXAMPLE 6

Using the mixture of 85% by weight of the propylene/ethylene block copolymer, 5% by weight of the ethylene/acrylic acid copolymer "500W", and 10% by weight of the polystyrene, as the adhesive, and the homopolypropylene as the surface layer, which were used in Example 1, each was melt kneaded in the individual extruder at about 220° C., and those compositions were fed into one die and laminated therein. The laminated product was extruded in the form of a parison. The parison was blow-molded to obtain a molded product for surfboard.

The adhesion between the urethane foam and the adhesive layer in this product was stonger than that

EXAMPLE 7

(i) Resin for Luster Layer (Surface Layer)

A crystalline propylene homopolymer (MFR: 2.0 g/10 min; boiling heptane extraction residue: 99% by weight) was used.

(ii) Resin for Deep Drawing Layer

A mixture of 40% by weight of a crystalline propylene/ethylene block copolymer (ethylene content: 5% by weight; MFR: 0.5 g/10 min; boiling heptane extraction residue: 98% by weight), 40% by weight of polyethylene (density 0.950 g/cm$^3$; MFR: 0.6 g/10 min) and 20% by weight of talc having a particle diameter of 1.5μ was kneaded in an extruder and extruded in the form of strand. The strand was cut to form pellets.

(iii) Adhesive Resin on Urethane Side

The same mixture was used in Example 1.

The above pellets of the resin (ii) were fed to a three-layer multimanifold die (width: 700 mm) at 230° C. by means of an extruder (diameter of a screw: 90 mm). The resin (i) was fed to the same die as above at 230° C. by means of the separate extruder (diameter of a screw: 40 mm), and the adhesive resin (iii) was also fed to the same die as above at 220° C. by means of other separate extruder. The temperature of the die was set at 230° C. A molten sheet extruded from the die was cooled and solidified successively on three rolls having a width of 700 mm and then subjected to a corona discharge treatment to produce a three-layer sheet for vacuum forming. The temperatures of the three rolls were as follows: 40° C. for the nearest roll relative to the die; 95° C. for the intermediate roll; and 50° C. for the farthest roll. The rotation speed of the rolls was 1.5 m/min. The total thickness of the sheet was 1.6 mm; the thickness of the luster layer was 0.20 mm; the thickness of the deep drawing layer (intermediate layer) was 1.25 mm; and the thickness of the adhesive layer was 0.1 mm.

The sheet was subjected to the vacuum forming in the same manner as in Example 1. The molded sheet was placed in a frame, and urethane foaming and molding were conducted to obtain a composite molded product.

The results obtained are shown in the Table below.

EXAMPLE 8

(i) Resin for Luster Layer (Surface Layer)

A crystalline propylene homopolymer (MFR: 2.0 g/10 min; boiling heptane extraction residue: 99% by weight) was used.

(ii) Resin for Deep Drawing Layer

A mixture of 30% by weight of a crystalline propylene/ethylene block copolymer (ethylene content: 5% by weight; MFR: 0.5 g/10 min; boiling heptane extraction residue: 98% by weight), 45% by weight of polyethylene (density: 0.950 g/cm$^3$; MFR: 0.6 g/10 min) and 20% by weight of talc having a particle diameter of 1.5μ was kneaded in an extruder and extruded in the form of strand. The strand was cut to form pellets.

(iii) Adhesive Resin on Urethane Side

A mixture of 65% by weight of a crystalline propylene/ethylene block copolymer (ethylene content: 5% by weight; MFR: 0.5 g/10 min; boiling heptane extraction residue: 98% by weight), 15% by weight of an ethylene/acrylic acid having an acrylic acid content of 20% by weight and MFR of 300 g/10 min ("500W", a product of Mitsubishi Petrochemical Co., Ltd.) and 20% by weight of acrylonitrile-butadiene-styrene copolymer (ABS) was kneaded in an extruder and extruded in the form of strand. The strand was cut to form pellets.

The above pellets of the resin (ii) were fed to a three-layer multimanifold die (width: 700 mm) at 230° C. by means of an extruder (diameter of a screw: 90 mm), and the resin (i) and the adhesive resin composition (iii) each was fed to the same die as above at 220° C. by means of the separate extruders (diameter of a screw: 40 mm). The temperature of the die was set at 220° C. A molten sheet extruded from the die was cooled and solidified successively on three rolls having a width of 700 mm and then subjected to a 500 Watts corona discharge treatment to produce a laminate sheet for vacuum molding. The temperatures of the three rolls were as follows: 40° C. for the nearest roll relative to the die; 95° C. for the intermediate roll; and 50° C. for the farthest roll. The rotation speed of the rolls was 1.5 m/min. The total thickness of the sheet was 1.6 mm; the thickness of the luster layer was 0.15 mm; the thickness of the deep drawing layer (intermediate layer) was 1.35 mm; and the thickness of the adhesive layer was 0.1 mm.

The sheet was subjected to the vacuum molding in the same manner as in Example 1. The molded sheet was placed in a frame, and urethane foaming and molding were conducted to obtain a composite molded product.

The results obtained are shown in the Table below.

TABLE

| | Adhesive Layer Composition (parts by weight) | | | | Mold Rease Property of Laminate Sheet | Composite Molded Product | | Adhesion between Adhesion Layer and Urethane Foam |
|---|---|---|---|---|---|---|---|---|
| | PP | E·AA | PS | SBS | | Adhesion between Deep Drawing Layer and Adhesive Layer (Cross Cut Test) | | |
| Example 1 | 85 | 5 (500W) | 10 | — | O | O | 100/100 | O |
| Example 2 | 60 | 15 (500W) | 10 | 15 | O | O | 100/100 | O |
| Example 3 | 45 | 30 (500W) | 10 | 15 | O~A | O | 100/100 | O |
| Example 4 | 75 | 15 (A221M) | 10 | — | O | O | 100/100 | O |
| Comparative Example 1 | 50 | 50 (500W) | — | — | X | O | 100/100 | O |

TABLE-continued

| | Adhesive Layer Composition (parts by weight) | | | | Mold Rease Property of Laminate Sheet | Composite Molded Product | | Adhesion between Adhesion Layer and Urethane Foam |
|---|---|---|---|---|---|---|---|---|
| | | | | | | Adhesion between Deep Drawing Layer and Adhesive Layer (Cross Cut Test) | | |
| | PP | E·AA | PS | SBS | | | | |
| Comparative Example 2 | 50 | — | 50 | — | O | Δ | 75/100 | X |
| Comparative Example 3 | 100 | — | — | — | O | O | 100/100 | X |
| Comparative Example 4 | — | — | 50 | 50 | O | X | 0/100 | O |
| Example 5 | 85 | 5 (500W) | 10 | — | O | O | 100/100 | O |
| Example 7 | 85 | 5 (500W) | 10 | — | O | O | 100/100 | O |
| Example 8 | 65 | 15 (500W) | 20(ABS) | — | O | O | 100/100 | O |

While the invention has been described in detail and with reference to specific embodiments thereof, it will be apparent to one skilled in the art that various changes and modifications can be made therein without departing from the spirit and scope thereof.

What is claimed is:

1. A composite molded product having a structure that an olefin-based resin molded product and a urethane foam are integrally laminated with an adhesive resin layer, said adhesive resin having a composition comprising
   (A) 55 to 90% by weight of an olefin-based resin;
   (B) 1 to 30% by weight of an ethylene/acrylic acid copolymer; and
   (C) 10 to 30% by weight of a styrene-based resin.

2. The composite molded product as in claim 1, wherein the olefin-based resin molded product is a laminate of a propylene homopolymer as a surface layer and a substrate having a composition comprising
   (a) 20 to 80% by weight of a polypropylene;
   (b) 10 to 80% by weight of a polyethylene;
   (c) 0 to 35% by weight of a styrene-based resin; and
   (d) 0 to 65% by weight of an inorganic fine powder.

3. The composite molded product as in claim 2, wherein the substrate has a composition comprising
   (a) 40 to 70% by weight of the polypropylene;
   (b) 10 to 55% by weight of the polyethylene;
   (c) 5 to 25% by weight of the styrene-based resin; and
   (d) 5 to 55% by weight of the inorganic fine powder.

4. The composite molded product as in claim 1, wherein the olefin-based resin in the adhesive composition is the same type of the olefin-based resin for forming the molded product.

5. The composite molded product as in claim 1, wherein the olefin-based resin in the adhesive composition is a polypropylene.

6. The composite molded product as in claim 2, wherein the polypropylene is a propylene/ethylene block copolymer.

7. The composite molded product as in claim 3, wherein the polypropylene is a propylene/ethylene block copolymer.

8. The composite molded product as in claim 5, wherein the polypropylene is a propylene/ethylene block copolymer.

* * * * *